US012534341B2

(12) United States Patent
Vishal

(10) Patent No.: US 12,534,341 B2
(45) Date of Patent: Jan. 27, 2026

(54) STRUCTURE FOR CONSTRUCTING AN IMPROVED GUIDE PILLAR SYSTEM OF A PNEUMATIC VACUUM ELEVATOR

(71) Applicant: Ruphavathy Vishal, Chennai (IN)

(72) Inventor: Ruphavathy Vishal, Chennai (IN)

(73) Assignee: Ruphavathy Vishal (IN)

( * ) Notice: Subject to any disclaimer, the term of this patent is extended or adjusted under 35 U.S.C. 154(b) by 0 days.

(21) Appl. No.: 18/292,026

(22) PCT Filed: Dec. 12, 2023

(86) PCT No.: PCT/IB2023/062523

§ 371 (c)(1),
(2) Date: Jan. 25, 2024

(87) PCT Pub. No.: WO2024/147046

PCT Pub. Date: Jul. 11, 2024

(65) Prior Publication Data

US 2025/0313432 A1 Oct. 9, 2025

(30) Foreign Application Priority Data

Jan. 2, 2023 (IN) ............................ 202341000167

(51) Int. Cl.
*B66B 9/04* (2006.01)
*B66B 7/02* (2006.01)

(52) U.S. Cl.
CPC . *B66B 9/04* (2013.01); *B66B 7/02* (2013.01)

(58) Field of Classification Search
CPC .................................. B66B 7/02; B66B 9/04
See application file for complete search history.

(56) References Cited

U.S. PATENT DOCUMENTS 10,351,388 B2 7/2019 Ascua et al.
11,414,302 B1 * 8/2022 De Ledebur ............ B66B 19/00

FOREIGN PATENT DOCUMENTS

| | | | | | |
|---|---|---|---|---|---|
| CN | 103863918 A | * | 6/2014 | | |
| CN | 104401851 A | * | 3/2015 | ......... | B66B 11/0423 |
| CN | 106882679 A | | 6/2017 | | |
| CN | 104787645 B | * | 6/2018 | ............... | B66B 9/04 |
| JP | H1087224 A | | 4/1998 | | |
| WO | 2021245455 A1 | | 12/2021 | | |
| WO | WO-2023021321 A1 | * | 2/2023 | ......... | B66B 11/0005 |

OTHER PUBLICATIONS

Machine Translation of CN 103863918.*

* cited by examiner

*Primary Examiner* — Diem M Tran
(74) *Attorney, Agent, or Firm* — Jason C. Cameron

(57) ABSTRACT

A structure 10 for constructing an improved guide pillar system of a pneumatic vacuum elevator is provided. The structure includes a column 20. The column includes at least four sides including a first side 40, a second side 50, a third side 60, and a fourth side 70. The structure includes at least one angled section 80 to provide radius edges to the third side. The structure includes at least one channel section 90 including a first wall 100 to support a covering sheet 110 of the external cylinder. The first wall includes a first projection 120 including a gasket lining 130 to provide a vacuum tight sealing between the covering sheet and the first wall. The at least one channel section includes a second wall 140 to support a beading 150 to force the covering sheet against the first wall to prevent relative movements of the covering sheet.

10 Claims, 3 Drawing Sheets

STRUCTURE FOR CONSTRUCTING AN IMPROVED GUIDE PILLAR SYSTEM OF A PNEUMATIC VACUUM ELEVATOR

EARLIEST PRIORITY DATE

This Application claims priority from a Complete patent application filed in India having patent application Ser. No. 202341000167 filed on 2nd day of January 2023 and titled A STRUCTURE FOR CONSTRUCTING AN IMPROVED GUIDE PILLAR SYSTEM OF A PNEUMATIC VACUUM ELEVATOR.

FIELD OF INVENTION

Embodiments of the present disclosure relate to a field of elevators and more particularly to a structure for constructing an improved guide pillar system of a pneumatic vacuum elevator.

BACKGROUND

An elevator is a machine which transports people and freights between different levels of a structure. The structure may include a building, a maritime vessel and the like. The elevator may be classified as a cable-assisted elevator, a hydraulic cylinder-assisted elevator, and a pneumatic vacuum elevator based on an actuation method of the elevator. Cables attached to an elevator cabin may be used to actuate the cable-assisted elevator. Similarly, hydraulic pistons associated with the elevator cabin may be used to actuate the hydraulic cylinder-assisted elevator. The pneumatic vacuum elevator utilizes vacuum created in an external cylinder to move the elevator cabin through the external cylinder.

Currently, the external cylinder of the pneumatic vacuum elevator may be fabricated by inserting covering sheets between columns of the pneumatic vacuum elevator. The covering sheets may be tightened to the columns by beadings Silicon may be used to seal the covering sheets with one or more edges of the columns The beadings and the covering sheets may undergo relative movement with respect to the columns, which may eventually break the sealing provided by the silicon. Breakage of the sealing may cause air inflow to the external cylinder from an external environment, thereby affecting functionality of the pneumatic vacuum elevator.

Hence, there is a need for an improved structure for constructing an improved guide pillar system of a pneumatic vacuum elevator to address the aforementioned issue(s).

BRIEF DESCRIPTION

In accordance with an embodiment of the present disclosure, a structure for constructing an improved guide pillar system of a pneumatic vacuum elevator is provided. The structure includes a column positioned in an external cylinder of the pneumatic vacuum elevator. The column includes at least four sides including a first side, a second side, a third side, and a fourth side. The structure also includes at least one angled section positioned at a first predefined portion of each of the first side and the second side. The at least one angled section is adapted to provide one or more radius edges to the third side of the column. The structure further includes at least one channel section positioned at a second predefined portion of each of the first side and the second side. The at least one channel section includes a first wall adapted to support a covering sheet of the external cylinder of the pneumatic vacuum elevator. The first wall includes a first projection including a gasket lining adapted to provide a vacuum tight sealing between the covering sheet and the first wall. The at least one channel section also includes a second wall adapted to support a beading adapted to force the covering sheet against the first wall to prevent one or more relative movements of the covering sheet with respect to the first wall, thereby forming the structure for constructing the improved guide pillar system.

To further clarify the advantages and features of the present disclosure, a more explicit description of the disclosure will follow by reference to specific embodiments thereof, which are illustrated in the appended figures. It is to be appreciated that these figures depict typical embodiments of the disclosure and are therefore not to be considered limiting in scope. The disclosure will be described and explained with additional details with the appended figures.

BRIEF DESCRIPTION OF THE DRAWINGS

The disclosure will be described and explained with additional specificity and detail with the accompanying figures in which.

Figure 1:
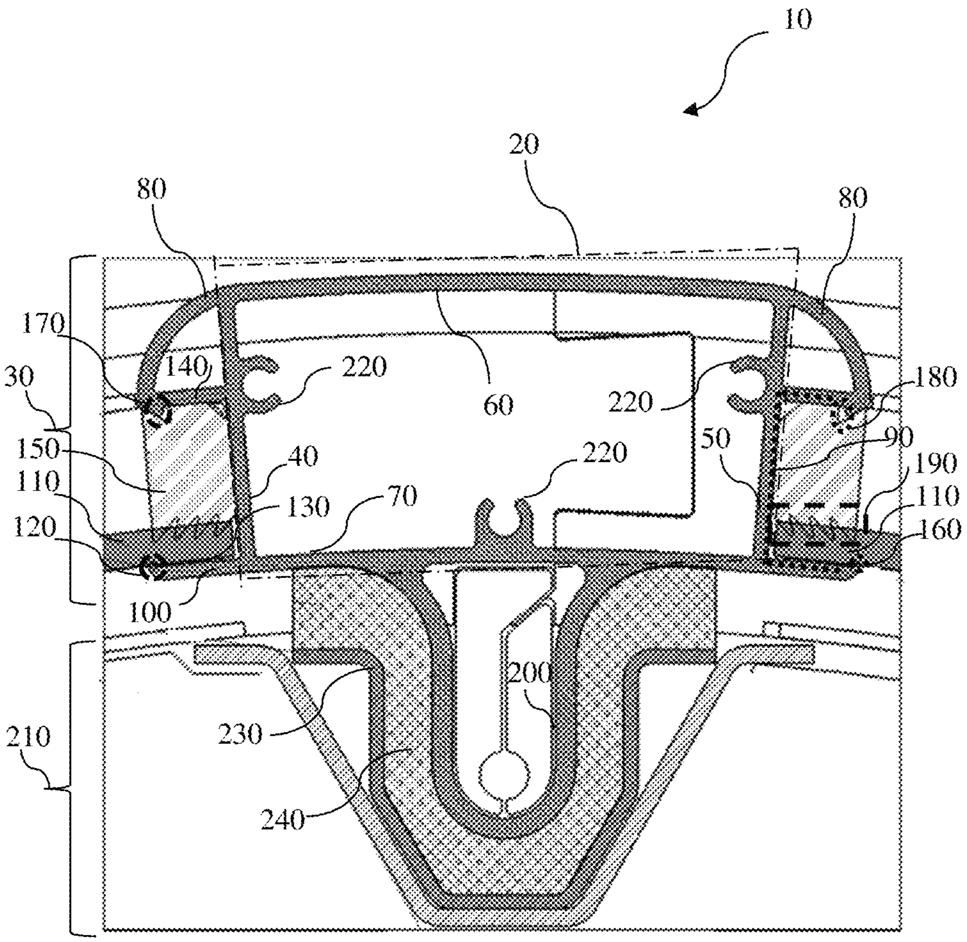
FIG. 1 is a schematic representation of a top view of a structure for constructing an improved guide pillar system of a pneumatic vacuum elevator in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

To promote an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a structure for constructing an improved guide pillar system of a pneumatic vacuum elevator. The structure includes a column positioned in an external cylinder of the pneumatic vacuum elevator. The column includes at least four sides including a first side, a second side, a third side, and a fourth side. The structure also includes at least one angled section positioned at a first predefined portion of each of the first side and the second side. The at least one angled section is adapted to provide one or more radius edges to the third side of the column. The structure further includes at least one channel section positioned at a second predefined portion of each of the first side and the second side. The at least one channel section includes a first wall adapted to support a covering sheet of the external cylinder of the pneumatic vacuum elevator. The first wall includes a first projection including a gasket lining adapted to provide a vacuum tight sealing between the covering sheet and the first wall. The at least one channel section also includes a second wall adapted to support a beading adapted to force the covering sheet against the first wall to prevent one or more relative movements of the covering sheet with respect to the first wall, thereby forming the structure for constructing the improved guide pillar system.

FIG. 1 is a schematic representation of a top view a structure (10) for constructing an improved guide pillar system of a pneumatic vacuum elevator in accordance with an embodiment of the present disclosure. The structure (10) includes a column (20) positioned in an external cylinder (30) of the pneumatic vacuum elevator. The column (20) includes at least four sides including a first side (40), a second side (50), a third side (60), and a fourth side (70). In one embodiment, the column (20) may include at least three grooved rib profiles (220) adapted to mechanically couple the column (20) to one or more elevator components (not shown in FIG. 1) through one or more fasteners (not shown in FIG. 1). In such an embodiment, each of the at least three grooved rib profiles (220) may be attached to an inner surface of the first side (40), the second side (50) and the fourth side (70).

Further, in one embodiment, the one or more elevator components may include at least one of a base ring, a band ring, a top of the external cylinder, a bottom of the external cylinder, and the like. As used herein, the base ring may be used to interconnect the external cylinder with another external cylinder. In one embodiment, the one or more fasteners may include, but not limited to, screws, nuts and bolts. The structure (10) also includes at least one angled section (80) positioned at a first predefined portion of each of the first side (40) and the second side (50). The at least one angled section (80) is adapted to provide one or more radius edges to the third side (60) of the column (20).

Moreover, the structure (10) further includes at least one channel section (90) positioned at a second predefined portion of each of the first side (40) and the second side (50). The at least one channel section (90) includes a first wall (100) adapted to support a covering sheet (110) of the external cylinder (30) of the pneumatic vacuum elevator. In one embodiment, the covering sheet (110) may include a polycarbonate sheet. In some embodiments, the poly carbonate sheet may be opaque. In another embodiment, the poly carbonate sheet may be transparent. In yet another embodiment, the poly carbonate sheet may be semitransparent.

Figure 2:
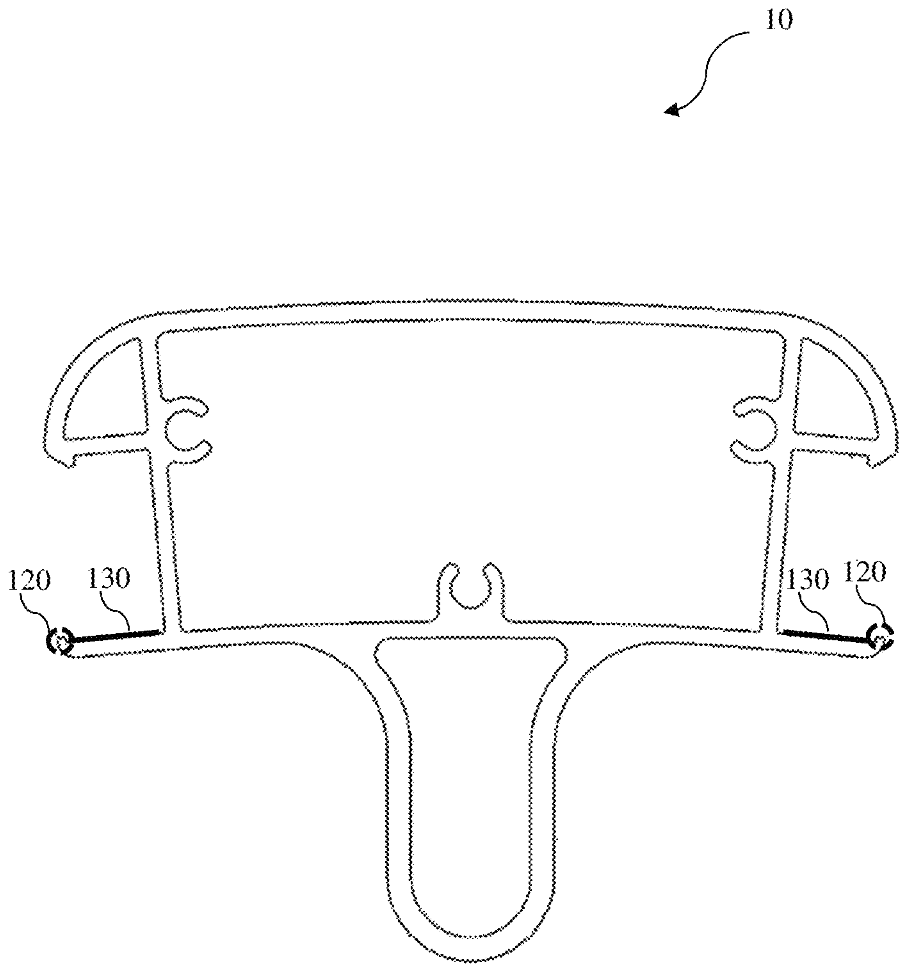
FIG. 2 is a schematic representation of one embodiment of the structure of FIG. 1, depicting a detailed view of a first projection and a gasket lining in accordance with an embodiment of the present disclosure.

Additionally, the first wall (100) includes a first projection (120) including a gasket lining (130) adapted to provide a vacuum tight sealing between the covering sheet (110) and the first wall (100) (as shown in FIG. 2). In some embodiments, the gasket lining (130) may be composed of at least one of a material including graphite, rubber, teflon, compressed non asbestos fiber, and poly tetra fluoro ethylene. In some embodiments, cross section of the first projection (120) may include at least one of a shape including rectangular, cuboid, tetrahedron, and triangular. In one embodiment, the covering sheet (110) may include one or more inclined slits (160) adapted to interlock with the first projection (120) to restrict the one or more relative movement of the covering sheet (110) with respect to the first wall (100).

Furthermore, in a specific embodiment, the first projection (120) may be forming an obtuse angle with the first wall (100). The at least one channel section (90) also includes a second wall (140) adapted to support a beading (150) adapted to force the covering sheet (110) against the first wall (100) to prevent one or more relative movements of the covering sheet (110) with respect to the first wall (100), thereby forming the structure (10) for constructing the improved guide pillar system. As used herein, the beading may be a material which may be provided along an edge of the covering sheet to provide support to the covering sheet. In a specific embodiment, the beading (150) may include at least one of a material comprising rubber, plastic and silicone.

Additionally, in one embodiment, the second wall (140) may include a second projection (170) adapted to interlock with a slot (180) provided on the beading (150) to restrict the one or more relative movements of the beading (150) with respect to the second wall (140). In a specific embodiment, the second projection (170) may be forming an acute angle with the second wall (140). In one embodiment, the beading (150) may include one or more saw tooth slits (190) adapted to displace laterally upon forcing the covering sheet (110) against the first wall (100) to restrict the one or more relative movements of the covering sheet (110) with respect to the beading (150).

Further, in some embodiments, cross section of the second projection (170) may seem like at least one of the shape including rectangular, cuboid, tetrahedron, and triangular. In some embodiments, the fourth side (70) may include a guide rail (200) located at an outer surface of the fourth side (70). In such an embodiment, the guide rail (200) may be adapted to support an elevator cabin (210) via one or more coupling components. In one embodiments, the one or more coupling components may include at least one of a guide bracket (230), a carpet layering (240), and the like. In an exemplary embodiment, the guide bracket (230) may be welded with the guide rail (200) along with the carpet layering (240) to avoid shaking of the elevator cabin (210) during movement of the elevator cabin (210).

Furthermore, in one embodiment, the carpet layering (240) may be composed of cloth, nylon or the like. In some embodiments, the guide rail (200) may be also adapted to guide the elevator cabin (210) during a bidirectional movement of the elevator cabin (210). In one embodiment, the guide rail (200) may be manufactured by an aluminium extrusion technique. As used herein, the aluminium extrusion technique may be defined as a technique in which aluminum alloy material may be forced through a die to obtain a required shape.

Figure 3:
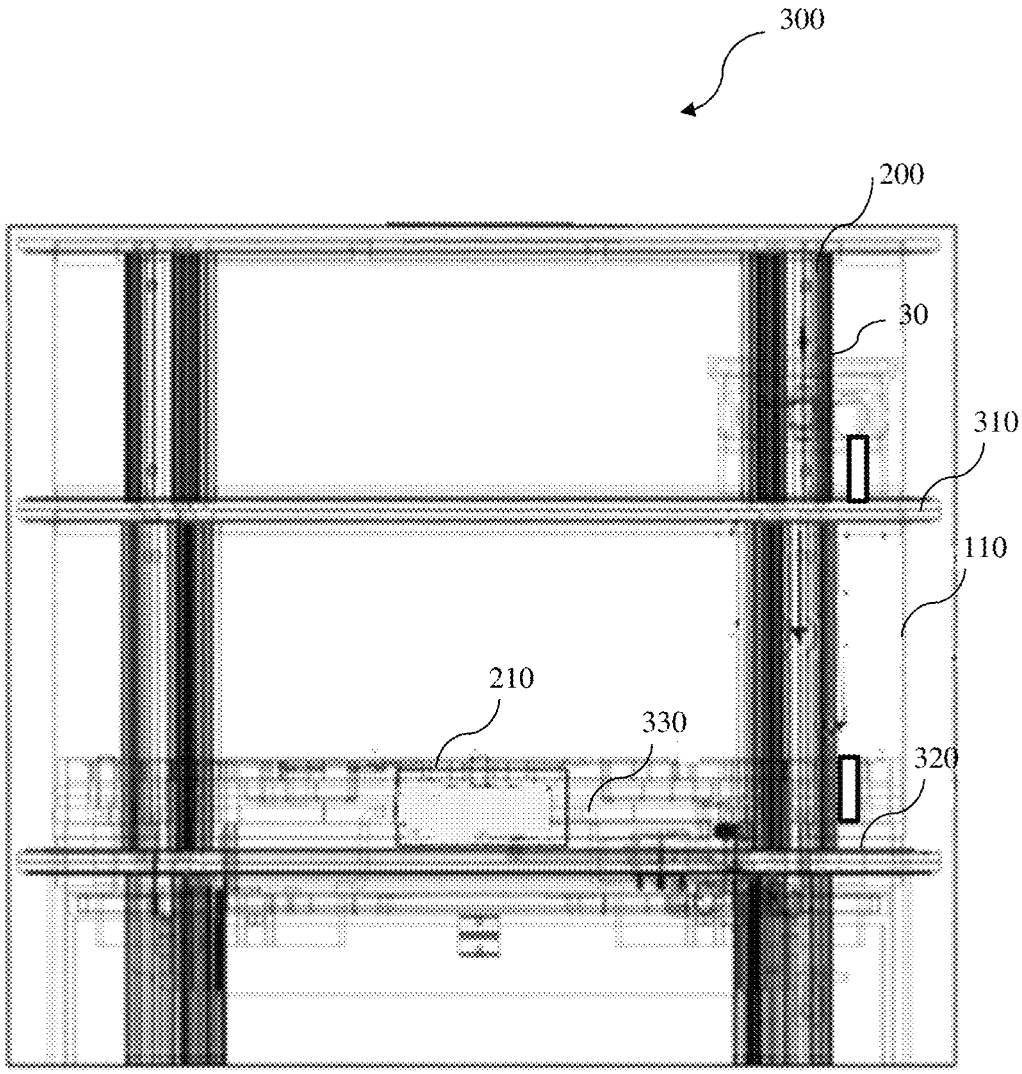
FIG. 3 is a schematic representation of a pneumatic vacuum elevator in accordance with an embodiment of the present disclosure.

FIG. 3 is a schematic representation of a pneumatic vacuum elevator in accordance with an embodiment of the present disclosure. The pneumatic vacuum elevator (300) includes an external cylinder (30) including an elevator cabin (210) inserted therein. The external cylinder (30) includes a plurality of cylinders coupled using a base ring (310) and a band ring (320). The pneumatic vacuum elevator (300) also includes a column (20) positioned in the external cylinder (30). The column (20) includes at least four sides including a first side (40), a second side (50), a third side (60), and a fourth side (70). The pneumatic vacuum elevator (300) also includes at least one angled section (80) positioned at a first predefined portion of each of the first side (40) and the second side (50).

Further, the at least one angled section (80) is adapted to provide one or more radius edges to the third side (60) of the column (20). The pneumatic vacuum elevator (300) further includes at least one channel section (90) positioned at a second predefined portion of each of the first side (40) and the second side (50). Each of the at least one channel section (90) includes a first wall (100) adapted to support a covering sheet (110) of the external cylinder (30) of the pneumatic vacuum elevator. The first wall (100) includes a first projection (120) including a gasket lining (130) adapted to provide a vacuum tight sealing between the covering sheet (110) and the first wall (100). Each of the at least channel section (90) also includes a second wall (140) adapted to support a beading (150) adapted to force the covering sheet (110) against the first wall (100) to prevent one or more relative movements of the covering sheet (110) with respect to the first wall (100).

Furthermore, the pneumatic vacuum elevator (300) further includes a guide rail (200) positioned adjacent to the second wall (140) and mechanically coupled to the elevator cabin (210). The guide rail (200) is disposed at the fourth side (70). The guide rail (200) is configured to guide an actuation of the elevator cabin (210). The pneumatic vacuum elevator (300) also includes a seal assembly (330) adapted to fit over a top portion of the elevator cabin (210). The seal assembly (330) is configured to seal the elevator cabin (210) to reduce vibrations during upward and downward movement of the elevator cabin (210). The seal assembly (330) includes a depressurizing system configured to prevent the elevator cabin (210) from coming into force contact with the external cylinder (30) during upward movement and contribute to safety of an elevator operation.

Various embodiments of the structure for constructing an improved guide pillar system of a pneumatic vacuum elevator described above enable various advantages. Provision of the first projection along with the gasket lining is capable of providing a vacuum tight sealing between the covering sheer and the first wall, thereby preventing the air inflow from the external environment to the external cylinder. The gasket lining eliminates a requirement of silicon for providing the sealing between the covering sheet and the first wall. The sealing provided by the gasket lining may not get affected by the relative movements of the beading and the covering sheet with respect to the column. Provision of the one or more inclined slots provided on the covering sheet is capable of restricting the one or more relative movements of the covering sheet with respect to the first wall, thereby providing a tight sealing between the covering sheet and the first wall.

Further, provision of the second projection provided on the second wall is capable of restricting the one or more relative movements of the beading with respect to the second wall, thereby enabling the beading to exert uniform pressure on the covering sheet. Also, the one or more saw tooth slits provided on the beading prevents one or more relative movements between the beading and the covering sheet, thereby providing superior sealing between the beading and the covering sheet.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and is not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A structure (10) for constructing an improved guide pillar system of a pneumatic vacuum elevator comprising:

- a column (20) positioned in an external cylinder (30) of the pneumatic vacuum elevator, wherein the column (20) comprises at least four sides comprising a first side (40), a second side (50), a third side (60), and a fourth side (70);
- at least one angled section (80) positioned at a first predefined portion of each of the first side (40) and the second side (50), wherein the at least one angled section (80) is adapted to provide one or more radius edges to the third side (60) of the column (20);
- at least one channel section (90) positioned at a second predefined portion of each of the first side (40) and the second side (50), wherein each of the at least one channel section (90) comprises:
  - a first wall (100) adapted to support a covering sheet (110) of the external cylinder (30) of the pneumatic vacuum elevator, wherein the first wall (100) comprises a first projection (120) comprising a gasket lining (130) adapted to provide a vacuum tight sealing between the covering sheet (110) and the first wall (100); and
  - a second wall (140) adapted to support a beading (150) adapted to force the covering sheet (110) against the first wall (100) to prevent one or more relative movements of the covering sheet (110) with respect to the first wall (100), thereby forming the structure (10) for constructing the improved guide pillar system, wherein the second wall (140) comprises a second projection (170) adapted to interlock with a slot (180) provided on the beading (150) to restrict the one or more relative movements of the beading (150) with respect to the second wall (140).

2. The structure (10) as claimed in claim 1, wherein the covering sheet (110) comprises one or more inclined slits (160) adapted to interlock with the first projection (120) to restrict the one or more relative movement of the covering sheet (110) with respect to the first wall (100).

3. The structure (10) as claimed in claim 1, wherein the first projection (120) is forming an obtuse angle with the first wall (100).

4. The structure (10) as claimed in claim 1, wherein the second projection (170) is forming an acute angle with the second wall (140).

5. The structure (10) as claimed in claim 1, wherein the beading (150) comprises one or more saw tooth slits (190) adapted to displace laterally upon forcing the covering sheet (110) against the first wall (100) to restrict the one or more relative movements of the covering sheet (110) with respect to the beading (150).

6. The structure (10) as claimed in claim 1, wherein the fourth side (70) comprises a guide rail (200) located at an outer surface of the fourth side (70), wherein the guide rail (200) is adapted to:

support an elevator cabin (210) via one or more coupling components; and guide the elevator cabin (210) during a bidirectional movement of the elevator cabin (210).

7. The structure (10) as claimed in claim 1, wherein the covering sheet (110) comprises a polycarbonate sheet.

8. The structure (10) as claimed in claim 1, wherein the gasket lining (130) is composed of at least one of a material comprising graphite, rubber, teflon, compressed non asbestos fiber, and poly tetra fluoro ethylene.

9. The structure (10) as claimed in claim 1, wherein the beading (150) comprises at least one of a material comprising rubber, plastic, and silicone.

10. A pneumatic vacuum elevator (300) comprising:

an external cylinder (30) comprising an elevator cabin (210) inserted therein, wherein the external cylinder (30) comprises a plurality of cylinders coupled using a base ring (310) and a band ring (320);

a column (20) positioned in the external cylinder (30), wherein the column (20) comprises at least four sides comprising a first side (40), a second side (50), a third side (60), and a fourth side (70);

at least one angled section (80) positioned at a first predefined portion of each of the first side (40) and the second side (50), wherein the at least one angled section (80) is adapted to provide one or more radius edges to the third side (60) of the column (20);

at least one channel section (90) positioned at a second predefined portion of each of the first side (40) and the second side (50), wherein each of the at least one channel section (90) comprises:

a first wall (100) adapted to support a covering sheet (110) of the external cylinder (30) of the pneumatic vacuum elevator, wherein the first wall (100) comprises a first projection (120) comprising a gasket lining (130) adapted to provide a vacuum tight sealing between the covering sheet (110) and the first wall (100);

a second wall (140) adapted to support a beading (150) adapted to force the covering sheet (110) against the first wall (100) to prevent one or more relative movements of the covering sheet (110) with respect to the first wall (100), wherein the second wall (140) comprises a second projection (170) adapted to interlock with a slot (180) provided on the beading (150) to restrict the one or more relative movements of the beading (150) with respect to the second wall (140);

a guide rail (200) positioned adjacent to the second wall (140) and mechanically coupled to the elevator cabin (210), wherein the guide rail (200) is disposed at the fourth side (70), wherein the guide rail (200) is configured to guide an actuation of the elevator cabin (210); and a seal assembly (330) adapted to fit over a top portion of the elevator cabin (210), wherein the seal assembly (330) is configured to seal the elevator cabin (210) to reduce vibrations during upward and downward movement of the elevator cabin (210), wherein the seal assembly (330) comprises a depressurizing system configured to prevent the elevator cabin (210) from coming into force contact with the external cylinder (30) during upward movement and contribute to safety of an elevator operation.

* * * * *